United States Patent Office 2,749,321
Patented June 5, 1956

2,749,321

SOLUTIONS OF ACRYLONITRILE VINYL CHLORIDE COPOLYMER MIXED WITH POLYMERS OF MULTINUCLEAR AROMATIC MONOMERS

George E. Ham, Dayton, Ohio, assignor, by mesne assignments, to The Chemstrand Corporation, a corporation of Delaware No Drawing. Application October 26, 1951,
Serial No. 253,460

12 Claims. (Cl. 260—32.6)

This invention relates to new fiber-forming compositions. Specifically, the invention relates to modified copolymers of vinyl chloride and acrylonitrile which have been found to manifest superior properties as are hereinafter described.

It is well-known that copolymers of from 35 per cent to 70 per cent of vinyl chloride and from 30 per cent to 65 per cent of acrylonitrile are capable of being spun into fibers by solution extrusion methods. With the specified proportions of acrylonitrile present these copolymers have superior tensile properties and at the same time are soluble in a wide variety of fiber solvents, such as acetone, other ketones and certain esters. The copolymers of this type are however objectionable as fiber-forming compositions because of the low thermal resistance of the fibers prepared therefrom. The fibers of this prior art type have been marketable because of the relatively low cost of the vinyl chloride, which is usually the major substituent, and because of the non-flammability of the fibers.

The primary purpose of the present invention is to provide new vinyl chloride compositions which are not objectionable with respect to their thermal stability. A further purpose of this invention is to provide an improved low cost fiber-forming composition. Additional purposes of this type invention will be apparent from the following description.

It has been found that the prior art vinyl chloride polymers, for example the copolymers of from 35 per cent to 70 per cent vinyl chloride and from 30 per cent to 65 per cent of acrylonitrile may be substantially improved with respect to their softening characteristics if they are blended with from two per cent to 35 per cent of a polymer of a polymerizable aromatic di- or tri-cyclic monomer containing a mono-olefinic group in a side chain.

Suitable polymers of polycyclic monomers for use in the practice of this invention are poly-N-vinylcarbazole, polyvinylanthracene, polyvinylnaphthalene, polyvinylpyrene, polyvinylfluorene, polyvinylphenoxthine, polyacenaphthylene, polyvinylbiphenyl, polyisopropenylbiphenyl, and polyvinylacenaphthene, and other polymerizable monomers containing a plurality of homocyclic and/or heterocyclic ring structures.

The fiber-forming vinyl chloride composition which may be used in blended form with the polymers of polycyclic monomers are those of from 35 per cent to 70 per cent of vinyl chloride copolymerized with sufficient acrylonitrile to render the resulting copolymer satisfactory with respect to fiber-forming physical properties. The copolymers may have copolymerized therein minor proportions of other monomers for the purpose of developing specialized properties, such as dye-receptivity. Comonomers imparting the dye-receptivity property may be vinylpyridine or other N-heterocyclic monomers. Fireproof properties are developed when minor proportions of vinylidene chloride are copolymerized therewith. Vinyl chloroacetate may be used as a third monomer and thereby the copolymer is made reactive with ammonia and amines and the resulting chemically treated polymer becomes dye-receptive. Other copolymers of substantial proportions of vinyl chloride, substantial proportions of acrylonitrile and minor proportions of one or more other copolymerizable monomers are useful in the practice of this invention, for example vinyl acetate, styrene, alkyl acrylates, alkyl methacrylates, alkyl fumarates, alkyl maleates, methacrylonitrile and other monomers copolymerizable with acrylonitrile and vinyl chloride.

The polymerizable aromatic di- or tri-cyclic monomers containing a mono-olefinic group in a side chain and the copolymers of acrylonitrile and vinyl chloride may be blended by a variety of procedures. The finely divided polymers may be mechanically mixed and thereafter fabricated into fibers by conventional methods, for example, the dissolution in suitable solvents and extrusion of the prepared solution through a die or spinneret containing a plurality of apertures. Following the preparation of the fiber by extrusion into a gaseous medium or a liquid medium adapted to remove the solvent from the continuous polymeric composition, the resulting fiber is then stretched, shrunk or otherwise subjected to physical working or heat-treatment to develop the optimum fiber properties. The methods of fabricating and processing the fibers is not regarded as part of this invention, except to the extent that a wider variation in types of processing is possible.

A preferred method of preparing a blended composition involves the dispersing of the polymeric components into a suitable solvent for both components. Suitable solvents are N,N-dimethylacetamide, N,N-dimethylformamide, gamma-butyrolactone, nitromethane, dimethyl phosphite, and ethylene carbonate. Solutions in these solvents are spun into fibers by conventional methods.

Further details of the invention are set forth with respect to the following specific examples:

*Example 1*

Ninety parts by weight of a copolymer of 59.8 per cent vinyl chloride and 40.2 per cent of acrylonitrile and ten parts by weight of polyvinylcarbazole were dissolved to the extent of twenty per cent in N,N-dimethylacetamide. The polymeric solution was spun through a spinneret having 30 apertures each 0.005 inch in diameter. The fibers were spun into a liquid medium comprised of 60 per cent dimethylacetamide and 40 per cent of water. After washing the resulting fiber in water and stretching 222 per cent at from 90 to 95° C. the fiber was found to have a tenacity of 1.62 grams per denier, an elongation of eight to nine per cent, and a zero strength temperature of 195° C.

A fiber prepared from the copolymer of 59.8 per cent of vinyl chloride and 40.2 per cent of acrylonitrile without addition of the polyvinylcarbazole was found to have a zero strength temperature of 163° C.

*Example 2*

The procedure described in the preceding experiment was used to prepare a fiber from a blend of 80 per cent of the vinyl chloride and acrylonitrile copolymer and 20 per cent of polyvinylcarbazole. The fiber prepared and processed by the described manner was found to have a tenacity of 1.22 grams per denier, an elongation of six to seven per cent and a zero strength temperature of 205° C.

*Example 3*

The procedure of Example 1 was used to prepare a fiber-forming blend of 95 per cent of the vinyl chloride-acrylonitrile copolymer and five per cent of polyvinylcarbazole. The fiber prepared in the described manner was found to have a zero strength temperature of 170° C.

Example 4

The fiber was prepared in the manner described in Example 3, except that poly-p-vinylbiphenyl was used in place of polyvinylcarbazole. The resulting fiber after processing was found to have a zero strength temperature of 171° C.

What I claim is:

1. A new composition of matter, capable of being formed into heat-stable fibers and filaments, which comprises a blend of from two to 35 parts by weight of (A) a polymer of the group consisting of poly-N-vinylcarbazole, polyvinylanthracene, polyvinylnaphthalene, polyvinylpyrene, polyvinylfluorene, polyvinylphenoxthine, polyacenaphthylene, polyvinylbiphenyl, polyisopropenylbiphenyl, and polyvinylacenaphthene, and from 65 to 98 parts of (B) a copolymer of from 35 to 70 percent by weight of vinyl chloride and at least 30 percent by weight of acrylonitrile dissolved in an organic solvent selected from the group consisting of N,N-dimethylformamide and N,N-dimethylactamide.

2. The composition as defined in claim 1 wherein the polymer of (A) is poly-N-vinylcarbazole.

3. The composition as defined in claim 1 wherein the polymer of (A) is polyvinylbiphenyl.

4. The composition as defined in claim 1 wherein the polymer of (A) is polyisopropenylbiphenyl.

5. The composition as defined in claim 1 wherein the polymer of (A) is polyacenaphthylene.

6. The composition as defined in claim 1 wherein the polymer of (A) is polyvinylnaphthalene.

7. A new composition of matter, capable of being formed into heat-stable fibers and filaments, which comprises a blend of from 5 to 25 parts by weight of (A) a polymer of the group consisting of poly-N-vinylcarbazole, polyvinylanthracene, polyvinylnaphthalene, polyvinylpyrene, polyvinylfluorene, polyvinylphenoxthine, polyacenaphthylene, polyvinylbiphenyl, polyisopropenylbiphenyl, and polyvinylacenaphthene, and from 75 to 95 parts by weight of (B) a copolymer of from 30 to 70 percent by weight of vinyl chloride and from 30 to 70 percent by weight of acrylonitrile dissolved in an organic solvent selected from the group consisting of N,N-dimethylformamide and N,N-dimethylactamide.

8. The composition as defined in claim 7 wherein the polymer of (A) is poly-N-vinylcarbazole.

9. The composition as defined in claim 7 wherein the polymer of (A) is polyvinvylbiphenyl.

10. The composition as defined in claim 7 wherein the polymer of (A) is polyisopropenylbiphenyl.

11. The composition as defined in claim 7 wherein the polymer of (A) is polyacenaphthylene.

12. The composition as defined in claim 7 wherein the polymer of (A) is polyvinylnaphthalene.

References Cited in the file of this patent

UNITED STATES PATENTS

| Number | Name | Date |
|---|---|---|
| 2,072,465 | Reppe et al. | Mar. 2, 1937 |
| 2,140,048 | Fikentscher et al. | Dec. 13, 1938 |
| 2,371,499 | Britton et al. | Mar. 13, 1945 |
| 2,420,330 | Shriver et al. | May 13, 1947 |
| 2,476,737 | Kern et al. | July 19, 1949 |
| 2,566,716 | Boe et al. | Sept. 4, 1951 |

OTHER REFERENCES

Chem. Eng. News, 29, 2552 (1951).

Schildknecht: "Vinyl and Related Polymers," pages 407–408, Wiley, N. Y. (1952).